United States Patent [19]

Hughes et al.

[11] Patent Number: 5,346,963

[45] Date of Patent: Sep. 13, 1994

[54] GRAFT-MODIFIED, SUBSTANTIALLY LINEAR ETHYLENE POLYMERS AND METHODS FOR THEIR USE

[75] Inventors: Morgan M. Hughes, Angleton; Kyle G. Kummer, Lake Jackson; Stephen R. Betso, Lake Jackson; Michael E. Rowland, Lake Jackson; Morris S. Edmondson, Alvin, all of Tex.

[73] Assignee: The Dow Chemical Company, Midland, Mich.

[21] Appl. No.: 54,376

[22] Filed: Apr. 28, 1993

[51] Int. Cl.$^5$ .............................. C08F 255/02
[52] U.S. Cl. ........................... 525/285; 525/274; 525/301; 525/309; 525/324
[58] Field of Search ............ 525/285, 301, 309, 324, 525/274

[56] References Cited

U.S. PATENT DOCUMENTS

| | | | |
|---|---|---|---|
| 3,236,917 | 2/1966 | Natta et al. | 260/878 |
| 3,868,443 | 2/1972 | Scheibler et al. | 423/392 |
| 3,884,882 | 5/1972 | Caywood, Jr. | 260/78.4 D |
| 3,956,230 | 5/1976 | Gaylord | 260/42.14 |
| 3,959,558 | 5/1976 | McKenzie, Jr. | 428/379 |
| 4,020,214 | 4/1977 | McKenzie, Jr. | 428/389 |
| 4,071,494 | 1/1978 | Gaylord | 260/42.14 |
| 4,134,927 | 1/1979 | Tomoshige et al. | 260/878 R |
| 4,174,358 | 11/1979 | Epstein | 525/183 |
| 4,198,327 | 4/1980 | Matsumoto et al. | 260/4 |
| 4,397,916 | 8/1983 | Nagano | 428/461 |
| 4,420,580 | 12/1983 | Herman et al. | 524/424 |
| 4,506,056 | 3/1985 | Gaylord | 524/445 |
| 4,762,890 | 8/1990 | Strait et al. | 525/257 |
| 4,908,411 | 3/1990 | Kinoshita et al. | 525/285 |
| 4,927,888 | 5/1990 | Strait et al. | 525/285 |
| 4,950,541 | 8/1990 | Tabor et al. | 428/373 |
| 5,021,510 | 6/1991 | Vroomans | 525/285 |
| 5,045,401 | 9/1991 | Tabor et al. | 428/516 |
| 5,055,526 | 10/1991 | Sato et al. | 525/74 |
| 5,106,692 | 4/1992 | Shigemoto | 428/412 |
| 5,112,916 | 5/1992 | Nakahashi et al. | 525/183 |
| 5,140,074 | 8/1992 | DeNicola, Jr. et al. | 525/263 |
| 5,194,509 | 3/1993 | Hasenbien et al. | 525/285 |

FOREIGN PATENT DOCUMENTS

| | | |
|---|---|---|
| 50-54130 | 1/1975 | Japan . |
| 59-027975A | 2/1984 | Japan . |
| 110702A | 1/1985 | Japan . |
| 4-153205A | 5/1992 | Japan . |

OTHER PUBLICATIONS

Gaylord et al., "Polymer-Filler Composites Thru In Situ Graft Copolymerization, I. Polyethylene-Clay Composites", pp. 456-459, Gaylord Research Institute.

*Primary Examiner*—Vasu S. Jagannathan

[57] ABSTRACT

Substantially linear ethylene polymers, e.g., polyethylenes prepared by constrained geometry catalysis (substantially linear ethylene), which are grafted with one or more unsaturated organic compounds containing both ethylenic unsaturation and a carbonyl group, e.g., maleic anhydride, exhibit desirable adhesive properties. These graft-modified substantially linear ethylene polymers also impart desirable compatibility and impact properties to various thermoplastic polymer blends.

12 Claims, No Drawings

GRAFT-MODIFIED, SUBSTANTIALLY LINEAR ETHYLENE POLYMERS AND METHODS FOR THEIR USE

BACKGROUND OF THE INVENTION

This invention relates to substantially linear ethylene polymers. In one aspect, this invention relates to such polymers grafted with an olefinically unsaturated organic compound, e.g., maleic anhydride, while in another aspect, the invention relates to blends of this grafted polymer with one or more other olefin polymers, grafted or ungrafted. In yet another aspect, this invention relates to blends of this grafted polymer with non-olefin polymers, e.g., polyamides.

The graft modification of polyolefins, such as polyethylene and polypropylene, with various olefinically unsaturated monomers is well known in the art. Such a modification renders an essentially nonpolar polyolefin material compatible, at least to some limited extent, with a polar material. This, in turn, impacts on the adhesive properties of the polyolefin, e.g., its ability to be laminated to a solid. For example, U.S. Pat. No. 4,198,327 teaches a modified crystalline polyolefin composition having improved adhesion to polar solid materials. U.S.Pat. No. 4,397,916 and 5,055,526 also teach adhesive resin compositions of modified polyolefins and laminates made from such polyolefins. In a like manner, Japanese publications J04153205-A and J59027975-A describe modified polyolefin compositions, including modified crystalline polypropylene, which have adhesive properties either as film or as in a multilayer laminate. In some cases, the adhesive properties of these modified polyolefins are not entirely satisfactory and as such, additional improvements in the adhesive properties of these modified polyolefin compositions are disclosed by the use of oils, waxes, styrene-containing polymers and other elastomer polymers, such as those disclosed in U.S.Pat. No. 4,908,411.

As these references suggest, much of the existing art is primarily concerned with the modification of these polyolefins to develop compositions having specific adhesive properties or improvements in adhesive properties. However, graft modification can have a detrimental impact on one or more other properties of the polyolefin. For example, U.S. Pat. Nos. 4,134,927; 3,884,882 and 5,140,074 all report undesirable changes in the rheological properties due to cross-linking of the modified material. These changes ultimately impact the processibility of the material and thus, its utility in commercial applications.

SUMMARY OF THE INVENTION

According to this invention, the adhesive properties of a graft-modified ethylene polymer are improved without adversely impacting the rheological properties of the polymer by preparing the graft-modified ethylene polymer from a substantially linear ethylene polymer and an unsaturated organic compound containing at least one ethylenic unsaturation and at least one carbonyl group.

In one embodiment of this invention, the graft-modified polyethylene is blended with one or more other polyolefins, either grafted or ungrafted. In another embodiment of this invention, the graft-modified polyethylene is blended with one or more polymers other than a polyolefin, either grafted or ungrafted.

The graft-modified polymers of this invention are useful as compatibilizers, and impart desirable impact resistance and strength properties to the polymer blends into which they are incorporated.

DESCRIPTION OF THE PREFERRED EMBODIMENTS

The substantially linear ethylene polymers used in the practice of this invention are known, and they and their method of preparation are fully described in U.S. Pat. No. 5,272,236 and U.S. Pat. No. 5,278,272, both of which are incorporated herein by reference. As here used, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, more preferably from about 0.05 long-chain branches/1000 carbons to about 1 long-chain branch/1000 carbons. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique polymers (subsequently referred to as "substantially linear ethylene polymers") are prepared by using constrained geometry catalysts (substantially linear ethylene), and are characterized by a narrow molecular weight distribution and if an interpolymer, by a narrow comonomer distribution. As here used, "interpolymer" means a polymer of two or more comonomers, e.g., a copolymer, terpolymer, etc., or in other words, a polymer made by polymerizing ethylene with at least one other comonomer. Other basic characteristics of these substantially linear ethylene polymers include a low residuals content (i.e., low concentrations in the substantially linear ethylene polymer of the catalyst used to prepare the polymer, unreacted comonomers, and low molecular weight oligomers made during the course of the polymerization), and a controlled molecular architecture which provides good processability even though the molecular weight distribution is narrow relative to conventional olefin polymers.

While the substantially linear ethylene polymers used in the practice of this invention include substantially linear ethylene homopolymers, preferably the substantially linear ethylene polymers used in the practice of this invention comprise between about 95 and 50 weight percent (wt %) ethylene, and about 5 and 50 wt % of at least one α-olefin comonomer, more preferably 10 to 25 wt % of at least one α-olefin comonomer. The comonomer content is measured using infrared spectroscopy according to ASTM D-2238 Method B. Typically, the substantially linear ethylene polymers are copolymers of ethylene and an α-olefin of 3 to about 20 carbon atoms (e.g., propylene, 1-butene, 1-hexene, 4-methyl-1-pentene, 1-heptene, 1-octene, styrene, etc.), preferably of 3 to about 10 carbon atoms, and more preferably these polymers are a copolymer of ethylene and 1-octene. The density of these substantially linear ethylene polymers is typically between about 0.850 to about 0.935 grams per cubic centimeter ($g/cm^3$), preferably of 0,870 to about 0.910 $g/cm^3$. The melt flow ratio, measured as $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For substantially linear ethylene polymers, the $I_{10}/I_2$ ratio indicates the degree of long-chain branching, i.e. the larger the $I_{10}/I_2$ ratio, the more long-chain branching in the polymer.

The unique characteristic of the homogeneously branched, substantially linear ethylene polymers is a highly unexpected flow property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

Substantially linear olefin polymers have a critical shear rate at onset of surface melt fracture of at least 50 percent greater than the critical shear rate at the onset of surface melt fracture of a linear olefin polymer having about the same $I_{12}$ and Mw/Mn.

The preferred melt index, measured as $I_2$ (ASTM D-1238, condition 190/2.16 (formerly condition E)), is from about 0.5 g/10 min to 200 g/10 min, more preferably 1 to 20 g/10 min. Typically, the preferred substantially linear ethylene polymers used in the practice of this invention are homogeneously branched and do not have any measurable high density fraction, i.e., short chain branching distribution as measured by Temperature Rising Elution Fractionation which is described in U.S. Pat. No. 5,089,321 which is incorporated in its entirety into and made a part of this application by reference or stated in another manner, these polymers do not contain any polymer fraction that has a degree of branching less than or equal to 2 methyls/1000 carbons. These preferred substantially linear ethylene polymers also consist of a single differential scanning calorimetry (DSC) melting peak.

Any unsaturated organic compound containing at least one ethylenic unsaturation (e.g., at least one double bond), at least one carbonyl group (—C=O), and that will graft to a substantially linear ethylene polymer as described above can be used in the practice of this invention. Representative of compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, α-methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the grafted substantially linear ethylene polymer is at least about 0.01 wt %, and preferably at least about 0.05 wt %, based on the combined weight of the polymer and the organic compound. The maximum amount of unsaturated organic compound content can vary to convenience, but typically it does not exceed about 10 wt %, preferably it does not exceed about 5 wt %, and more preferably it does not exceed about 2 wt %.

The unsaturated organic compound can be grafted to the substantially linear ethylene polymer by any known technique, such as those taught in U.S. Pat. No. 3,236,917 and U.S. Pat. No. 5,194,509 which are incorporated into and made a part of this application by reference. For example, in the '917 patent the polymer is introduced into a two-roll mixer and mixed at a temperature of 60° C. The unsaturated organic compound is then added along with a free radical initiator, such as, for example, benzoyl peroxide, and the components are mixed at 30 C until the grafting is completed. In the '509 patent, the procedure is similar except that the reaction temperature is higher, e.g., 210° to 300° C., and a free radical initiator is not used or is used at a reduced concentration.

An alternative and preferred method of grafting is taught in U.S. Pat. No. 4,950,541, the disclosure of which is incorporated into and made a part of this application by reference, by using a twin-screw devolatilizing extruder as the mixing apparatus. The substantially linear ethylene polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

The graft-modified substantially linear ethylene polymers of this invention have many and varied uses. In one embodiment, these polymers are used as compatibilizers for filled resinous products. Many molded and extruded products contain fillers, e.g., silica, talc, glass, clay, carbon black, and the like, for strength and/or some other desirable property. Often these fillers are only marginally compatible with the resinous matrix within which they are incorporated and as such, the amount of filler that can be incorporated into the matrix, i.e., the loading level, is limited. Compatibilizers are used to coat or otherwise treat the filler to render it more compatible with the matrix, and thus allow a high loading to be achieved. The graft-modified substantially linear ethylene polymers of this invention are particularly desirable compatibilizers because higher loading levels can be achieved, i.e. either more filler can be incorporated into a given resin matrix based on the amount of compatibilizer, or less compatibilizer is required to incorporate the same amount of filler. In addition, the compatibilizers of this invention impart desirable properties to the composition in both fabricated and prefabricated form. In fabricated form, the strength and impact properties are enhanced relative to fabricated compositions void of grafted substantially linear ethylene polymer. In pre-fabricated form, for example, pellets, sheet, uncured packaging, etc., the processability of the compositions by batch or continuous methods are enhanced relative to compositions void of grafted substantially linear ethylene polymer.

The amount of graft-modified substantially linear ethylene polymer required to effectively serve as a compatibilizer will, of course, vary with the nature of the resinous matrix, the nature and amount of filler, the chemical and physical characteristics of the substantially linear ethylene polymer and unsaturated organic compound containing a carbonyl group (and the extent of grafting), and similar factors. Typically, the weight ratio of graft-modified substantially linear ethylene polymer to filler is between about 1:50 to about 50:1, preferably between about 1:40 to about 20:1.

In another embodiment of this invention, the graft-modified substantially linear ethylene polymer is dry blended or melt blended with another thermoplastic polymers, and then molded or extruded into a shaped article. Such other thermoplastic polymers include any polymer with which the grafted substantially linear ethylene polymer is compatible, and include both olefin and non-olefin polymers, grafted and ungrafted. The grafted substantially linear ethylene polymer can also be blended with another substantially linear ethylene polymer, a conventional heterogeneously branched or homogeneously branched linear ethylene polymer, a non-olefin polymer, any of which can be grafted or ungrafted, or any combination of these polymers. Examples of such polymers include high density polyethylene (HDPE), low density polyethylene (LDPE), linear low density polyethylene (LLDPE), ultra low density polyethylene (ULDPE), polypropylene, ethylene-propylene copolymer, ethylene-styrene copolymer, polyisobutylene, ethylene-propylene-diene monomer (EPDM), polystyrene, acrylonitrile-butadiene-styrene (ABS) copolymer, ethylene/acrylic acid (EAA), ethylene/vinyl acetate (EVA), ethylene/vinyl alcohol (EVOH), polymers of ethylene and carbon monoxide (ECO, including those described in U.S. Pat. No. 4,916,208), or ethylene, propylene and carbon monoxide (EPCO) polymers, or ethylene, carbon monoxide and acrylic acid(ECOAA) polymers, and the like. Representative of the non-olefin polymers are the polyesters, polyvinyl chloride (PVC), epoxies, polyurethanes, polycarbonates, polyamides, and the like. These blending polymers are characterized by a compatibility with the grafted substantially linear ethylene polymer such that the melt blend does not separate into separate polymer phases. If more than one of these polymers is blended with one or more grafted substantially linear ethylene polymers, then all usually exhibit sufficient compatibility with each other, one-to-one or at least in combination with one or more other polymers, such that the polymeric components do not separate into separate polymer phases which could lead to extrusion processing difficulties, such as extrudate surging, film band-effects, etc.

The amount of graft-modified substantially linear ethylene polymer that is blended with one or more other polymers can be varied and is dependent upon many factors, including the nature of the other polymer or polymers, the intended end use of the blend, the presence or absence and if present, the nature, of additives, and the like. For molded articles, particularly engineered materials (e.g. hoses, shrouds, etc.), the grafted substantially linear ethylene polymer is blended with an engineering plastic, e.g. polyamide, such that the blended composition comprises between about 2 and about 70 wt % of the graft-modified substantially linear ethylene polymer(s), preferably between about 5 and about 30 wt %, total weight basis. In those applications in which the grafted substantially linear ethylene polymer is blended with other polyolefin polymers, e.g. a non-grafted substantially linear ethylene polymers or a conventional polyolefin polymer (LLDPE, HDPE, PP, etc.), the blend comprises between about 2 and about 70 wt % of the graft-modified substantially linear ethylene polymer, preferably between about 5 and about 30 wt %. Wire and cable are end use applications for such polymer blends. The presence of the graft-modified substantially linear ethylene polymer in these blends, both for engineered materials and wire and cable, provides improved impact and/or strength properties to the compositions.

In other embodiments, the graft-modified substantially linear ethylene polymer comprises from a relatively minor amount (e.g. 10 wt %), up to 100 wt % of the finished article. In those applications in which the paintability of the finished article is of importance, incorporation of between about 30 to about 70 wt % of a graft-modified substantially linear ethylene polymer will impart desirable paintability properties to an otherwise unpaintable molded article, e.g. an article prepared from a polyolefin such as polyethylene, polypropylene, etc.

In another application, the grafted substantially linear ethylene polymer is made into a film comprising up to 100 wt % of the graft-modified substantially linear ethylene polymer. Such films exhibit desirable adhesive properties, and are useful as tie layers in various packaging applications, e.g. tying another polyolefin to polypropylene, polyester, polyamide, EVOH, paperboard, foil, etc. These laminated or coextruded structures have utility as lidding stock, pouches for liquid foods, bag and box packaging structures, barrier packaging films, and the like.

As noted above, the polymer blends in which the graft-modified substantially linear ethylene polymer is incorporated can include other additives, such as fillers, colorants, antioxidants, antistats, slip agents, tackifiers, fragrances, and the like. These additives are incorporated by known methods.

In another embodiment of this invention, the grafted substantially linear ethylene polymer is "let-down" or diluted with virgin substantially linear ethylene polyolefin or another grafted substantially linear ethylene polymer prior to mixing it with a blending polymer. For example, after the grafted substantially linear ethylene polymer has been prepared as described in U.S. Pat. No. 4,950,541, it is then back-blended in an extruder with vary substantially linear ethylene polymer to a predetermined dilution. Let-down or dilution ratios will vary with the ultimate application of the grafted substantially linear ethylene polymer, but weight ratios between 1:10 and 10:1 are typical.

The grafted substantially linear ethylene polymers of this invention, and blends comprising these polymers, are more fully described in the following examples. Unless indicated to the contrary, all parts and percentages are by weight, total weight basis.

SPECIFIC EMBODIMENTS

Sample Preparation

All samples were prepared by feeding polymer as described in Table 1 into a Werner-Pfleiderer ZSK-53/5L co-rotating twin screw extruder operated at the conditions described in Table 2. After the polymer was fed into the extruder, a mixture of maleic anhydride (MAH)/methyl ethyl ketone (MEK)/LUPERSOL 130 (Initiator) at a weight ratio of 1:1:0.032, respectively, was fed into the end of Zone 1 of the extruder through an injection nozzle by a metering pump. LUPRSOL 130 is 2,5-di(t-butyl peroxy)hexyne-3 manufactured and sold by Atochem. The extruder was maintained at a vacuum level of greater than or equal to 26 inches of mercury to facilitate devolatization of solvent, unreacted MAH and other contaminates. The percent of incorporation of MAH into each polymer is also reported in Table 1. Example C1 is an Attane® resin, a ULDPE ethylene/1-octene resin manufactured and sold by The Dow Chemical Company. Example C2 is a Dowlex® resin, a LLDPE ethylene/1-octene resin manufactured and sold by The Dow Chemical Company. Example C3 is Tafmer® P-0180 resin, an ethylene/propylene copolymer resin manufactured and sold by Mitsui Petrochemical. Examples C1, C2 and C3 are comparative examples. The resin used in Examples 1–4 was a substantially linear ethylene polymer of ethylene and 1-octene.

TABLE I

Incorporation of Maleic Anhydride into Conventional and Subtantially Linear Ethylene Polyethylene

| Example | Melt Index* | Density* (g/cm³) | Melt Flow Ratio* $I_{10}/I_2$ | % Incorporation |
|---|---|---|---|---|
| C1 | 3.4 | 0.906 | 7.65 | 40.2 |
| C2 | 25.0 | 0.917 | — | 25.3 |
| C3 | 5.0 | 0.870 | 5.91 | 48.9 |
| 1 | 7.0 | 0.903 | 7.57 | 68.9 |
| 2 | 5.0 | 0.871 | 7.66 | 57.3 |
| 3 | 0.75 | 0.870 | 7.58 | 62.3 |
| 4 | 25.0 | 0.870 | — | 30.6 |

*Ungrafted polymer

TABLE 2

Extruder Operation Conditions

| Barrel Temp (C.) | C1 | C2 | C3 | 1 | 2 | 3 | 4 |
|---|---|---|---|---|---|---|---|
| Zone 1 | 164 | 156 | 177 | 142 | 140 | 150 | 162 |
| Zone 2 | 191 | 193 | 200 | 176 | 186 | 195 | 154 |
| Zone 3 | 201 | 198 | 202 | 195 | 206 | 198 | 203 |
| Zone 4 | 236 | 206 | 200 | 180 | 192 | 221 | 207 |
| Polymer Melt Temp (C.) | 177 | 162 | 162 | 173 | 162 | 163 | N/A* |
| Screw Speed (rpm) | 300 | 300 | 320 | 320 | 255 | 300 | 320 |
| Polymer Feed Rate (lb/hr) | 150 | 150 | 135 | 150 | 130 | 135 | 135 |
| MAH/MEK/Initiator Feed Rate (lb/hr) | 6.45 | 5.92 | 5.96 | 5.57 | 5.90 | 5.84 | 5.46 |

*N/A = Not Available

The data of Table 1 show that the grafting of a substantially linear ethylene polymer is more efficient than the grafting of a non-substantially linear ethylene polymer having similar physical properties of melt index, density, and melt flow ratio. The polymer of Example 1 is a substantially linear ethylene polymer with a melt index of 7.0 dg/min and a density of 0.903 g/cm3, and 68.9% of the MAH was incorporated into it. In comparison, the polymer of Comparative Example 1 is a non-substantially linear ethylene polymer (ULDPE) with a melt index of 3.4 dg/min and a density of 0.906 g/cm3, but only 40.2% of the MAH was incorporated under similar conditions. The substantially linear ethylene polymer incorporated 70% more MAH under similar conditions than did the comparative non-substantially linear ethylene polymer. In addition, this improvement in MAH incorporation was realized over a range of densities and melt flow rates. These results mean that the graft-modified substantially linear ethylene polymers of this invention can be prepared with lower loss of materials (i.e. lower levels of MAH required to obtain the same level of grafting as for non-substantially linear ethylene polymers), and lower emissions due to the use of less volatiles.

Adhesive Properties

The adhesive properties of the grafted polymer samples of Comparative Example 1 and Example 1 were determined by heat seal lamination. The graft-modified polymers were fabricated into blown film having a thickness of 0.003 inches. Film test samples, one inch in width, were cut from the blown film and heat sealed to polypropylene, polyamide, ethylene/vinyl alcohol, polycarbonate and polyetherimide films at selected temperatures. The heat seal conditions were 40 lb/in² of pressure applied for 0.5 seconds by means of heated seal bars set at the desired temperature. The strength of the heat seals was determined on an Instron tensionmeter apparatus using a 180 degree ("T") pull at a crosshead speed of 2 in/min. The data from these tests are reported in Table 3.

TABLE 3

Heat Seal Comparisons

| Substrate | Temperature (C.) | C1 Film Heat Seal Strength (lb/in) | Ex. 1 Film Heat Seal Strength (lb/in) |
|---|---|---|---|
| Polypropylene | 130 | 0 | 0 |
|  | 140 | 0 | 0 |
|  | 150 | 0.1 | 0.4 |
|  | 160 | 0.3 | 1.1 |
|  | 170 | 1.8 | 2.6 |
|  | 180 | 2.0 | 2.8 |
| Polyamide | 130 | 0.6 | 1.0 |
|  | 140 | 0.6 | 1.0 |
|  | 150 | 1.0 | 1.5 |
|  | 160 | 1.5 | 1.5 |
|  | 170 | 2.0 | 2.1 |
|  | 180 | 2.2 | film failure |
| Ethylene/vinyl alcohol | 130 | 1.3 | 1.0 |
|  | 140 | 1.3 | 1.0 |
|  | 150 | 1.3 | 1.2 |
|  | 160 | 1.6 | 1.5 |
|  | 170 | 2.0 | 2.0 |
|  | 180 | 2.5 | 2.3 |
| Polycarbonate | 230 | 0.2 | 1.5 |
| Polyetherimide | 230 | 1.0 | 0.8 |

The film test samples of Example 1 gave improved adhesion to polypropylene, polyamide and polycarbonate substrates, as well as similar adhesion to EVOH and polyetherimide, as compared to the film test samples of Comparative Example 1. Additional improvements in the adhesive properties of the graft-modified substantially linear ethylene polymers can be realized with respect to changes in resin density and fabrication techniques, e.g., extrusion lamination or multilayer extrusion. Improvement can also be obtained in the adhesive properties of such blends by using a grafted substantially linear ethylene polymer that has been back-blended or let-down with an ungrafted substantially linear ethylene polymer.

Impact Properties

The use of graft-modified substantially linear ethylene polymers to improve the impact properties of various polymer blends was evaluated by incorporating the polymer into a polyamide resin (CAPRON 8207, manufactured and sold by Allied-Signal). Melt blends of the polyamide with 0, 10 and 25 wt % of the graft-modified substantially linear ethylene polymer were prepared on an extruder prior to molding on an injection molding machine. The injection molded test samples (IZOD specimens) were evaluated for room temperature notched IZOD impact performance. The results are reported in Table 4.

TABLE 4

IZOD Impact Comparisons

| Blend Compositions | | |
|---|---|---|
| Polyamide (wt %) | Modifier (wt %) | IZOD Impact (ft-lb/in) |
| Polyamide (100%) | None | 1.3 |
| Polyamide (90%) | C1 (10%) | 2.7 |
| Polyamide (75%) | C1 (25%) | 15.4 |
| Polyamide (90%) | Ex. 1 (10%) | 4.0 |
| Polyamide (75%) | Ex. 1 (25%) | 16.1 |

As is evident from the data in this Table, polyamide blends containing the graft-modified substantially linear ethylene polymer have higher IZOD impact performance as compared to blends containing a graft-modified ULDPE, i.e., Comparative Example 1. Additional improvements can be realized by lowering in the polymer density.

Compatibilization Properties

These properties were evaluated by blending a graft-modified substantially linear ethylene polymer with a base composition containing an unmodified substantially linear ethylene polymer (1 MI, 0.902 g/cm$^3$ density), an inorganic filler (240 parts per hundred resin (phr)), vinyl silane treated aluminum trihydrate), peroxide (5 phr Vulcup 40 KE), coagent (0.8 phr TAC—triallyl cyanurate), and a hydrocarbon oil (80 phr Sunpar 2280). Melt blends containing 0, 5 and 10 parts of the graft-modified substantially linear ethylene polymer phr were prepared on a small Banbury internal mixer. The blended samples were compression molded and evaluated for tensile strength properties before and after curing. The curing conditions were 1 minute at 400° F. (204° C.). The tensile strength properties for these blends are reported in Table 5.

TABLE 5

Tensile Strength Properties

| Sample | Ungrafted Base Resin (phr) | Ex 1 Level (phr) | Tensile Strength Uncured (psi) | Tensile Strength Cured (psi) |
|---|---|---|---|---|
| A | 100 | 0 | 709 | 1243 |
| B | 95 | 5 | 1097 | 1486 |
| C | 90 | 10 | 1223 | 1421 |

AS shown by the data in this Table, the incorporation of graft-modified substantially linear ethylene polymer into these compositions allows for compatibilization of an inorganic filler with a resin matrix resulting in higher tensile strength properties. In addition, higher tensile strengths properties are obtained both before and after curing.

Processibility

The processibility of the graft-modified substantially linear ethylene polymers as compared to graft-modified non-substantially linear ethylene polymers was determined from the reduced melt viscosity vs. shear rate data obtained from capillary rheology evaluations at 190 C. In order to obtain these data, the apparent melt viscosity (poise) vs. apparent shear rate (1/seconds) data was generated according to the ASTMD-3835 method. The reduced melt viscosity data were calculated by dividing the melt viscosity (n) obtained at each shear rate by the melt viscosity (n*) measured at the lowest possible shear rate. For the condition used in these determinations, the lowest shear rate corresponds to 2.96 seconds$^{-1}$. An example of these reduced melt viscosity calculations are illustrated below.

Capillary Rheology Data

Apparent Melt Viscosity at 2.96 seconds$^{-1}$=74,800 poise (m*)

Apparent Melt Viscosity at 7.40 seconds$^{-1}$=46,400 poise (n)

Reduced Melt Viscosity at 2.96 seconds$^{-1}$=1.000 (n*/n*)

Reduced Melt Viscosity at 7.40 seconds$^{-1}$=0.620 (n/n*)

These reduced melt viscosity data are calculated from the lowest (2.96 seconds$^{-1}$) to the highest shear rate (2960 seconds$^{-1}$) obtained from the capillary rheology evaluations. These reduced melt viscosity data are reported in Table 6 for Comparative Examples 1 and 3 and Examples 1 and 2.

TABLE 6

Reduced Melt Viscosity Data

| Apparent Shear Rate (second$^{-1}$) | Reduced Melt Viscosity ($\times 10^3$) | | | |
|---|---|---|---|---|
| | C1 | C3 | 1 | 2 |
| 2.96 | 1000 | 1000 | 1000 | 1000 |
| 7.40 | 620 | 610 | 600 | 600 |
| 14.80 | 450 | 450 | 430 | 420 |
| 29.60 | 330 | 330 | 300 | 295 |
| 74.00 | 220 | 220 | 190 | 185 |
| 148.00 | 150 | 150 | 130 | 125 |
| 296.00 | 110 | 90 | 90 | 85 |
| 740.00 | 60 | 58 | 51 | 48 |
| 1480.00 | 37 | N/A | 31 | 29 |
| 2960.00 | 22 | N/A | 19 | 18 |

N/A = Not Available

The data in Table 6 illustrate the effect of shear rate on melt viscosity (i.e., reduced) for Comparative Example 1 vs. Example 1, and Comparative Example 3 vs. Example 2. These data show that the compositions of this invention have significantly lower melt viscosities as compared to the noninventive compositions at most, if not all, corresponding shear rates.

The percent difference between the reduced melt viscosity values for Example 1 and Comparatige Example 1 were calculated at each corresponding shear rate. This data is reported in Table 7.

TABLE 7

Calculated Percent Difference in
Reduced Melt Viscosity (Ex 1 versus C1)

| Apparent Shear Rate (seconds$^{-1}$) | Percent Difference* in Reduced Melt Viscosity |
| --- | --- |
| 2.96 | 0.0 |
| 7.40 | 3.3 |
| 14.80 | 4.7 |
| 29.60 | 10.0 |
| 74.00 | 15.8 |
| 148.00 | 15.4 |
| 296.00 | 22.0 |
| 740.00 | 17.6 |
| 1480.00 | 19.4 |
| 2960.00 | 15.8 |

*Percent Difference Calculation (at 7.40 seconds$^{-1}$)
$\frac{(620-600)}{600} \times 100 = 3.3\%$ The percent difference data in Table 7 show that the graft-modified substantially linear ethylene polymers of this invention are significantly different from the graft-modified non-substantially linear ethylene polymers (the lower the melt viscosity at a given shear rate, generally the better the processibility of the polymer). Moreover, the magnitude of these differences increases with shear rate, and this is especially important because the higher shear rates are within the region of commercial importance. The benefit of lower melt viscosities is improved extrusion processability, i.e., lower extrudate energy consumption, nonsurging, smoother extrudate, etc.

Impact Properties of Certain Blends Containing Graft-modified Substantially Linear Ethylene Polymer The following materials were used in this test: ADMER QF 500A, a polypropylene grafted with 1.5 wt % MAH and manufactured and sold by Mitsui Petrochemical; the grafted polymer had a melt index of 3.0 g/10 min at 230 C and a density of 0,900 g/cm$^3$.

PRIMACOR ® 3460, a copolymer of ethylene and acrylic acid manufactured and sold by The Dow Chemical Company; this material contained 9.7 wt % acrylic acid monomer and had a melt index of 20 g/10 min.

Graft-modified substantially linear ethylene polymer; this material contained 1.3 wt % MAH, had a melt index of 0.25 g/10min, and a density of 0.870 g/cm$^3$.

Profax ® 6524, a polypropylene manufactured and sold by Himont; it had a melt index of 4 g/10 min at 230 C. and a density of 0.9 g/cm$^3$.

The graft-modified substantially linear ethylene polymer was prepared according to the procedure described in U.S. Pat. No. 4,950,541. The polymer components were dry mixed at a certain weight ratio (as reported in Table 8), and were then fed into a Werner-Pfleiderer ZSK-30 twin-screw extruder operated at about 210 C. The blends were made in one extrusion pass.

TABLE 8

Compositions of Testing Samples

| Sample | Graft-Modified Polypropylene (Admer ® QF 500A) | Polypropylene (Profax ® 6524) | Graft-Modified Substantially Linear Ethylene Polymer | EAA (PRIMACOR ®) 3460 |
| --- | --- | --- | --- | --- |
| C4 | 100 | — | — | — |
| C5 | 50 | — | — | 50 |
| 5 | — | — | 50 | 50 |
| 6 | 50 | — | 50 | — |
| 7 | 50 | — | 20 | 30 |
| 8 | — | 50 | 20 | 30 |

Injection molded samples were prepared using a 50 ton Negri-Bossi Injection Molder operated with a barrel temperature between 200° and 250° C., a barrel pressure of 40 bars, cooling mold temperature of 85° F. (29° C.), and a residence time in the cooling mold of about 12 seconds. The samples were formed into 2.5"×6.5"×0.075"plaques.

The flex modulus and IZOD impact properties (at room temperature and −30° C.) were measured for each of the samples in Table 8. These properties are important in many applications, e.g., automobile parts. The properties were measured according to ASTMD-790 and D-256, respectively, and the results are reported in Table 9. Samples 6 and 7 exhibit very good low temperature impact properties, the result of the presence of the graft-modified substantially linear ethylene polymer.

TABLE 9

Impact Properties and Flex Modulus

| Sample | Flex Modulus (kpsi) | IZOD at Room Temp (ft-lb/in) | IZOD at −30 C. (ft-lb/in) |
| --- | --- | --- | --- |
| C4 | 135 | 8.3 | 0.55 |
| C5 | — | 2.76 | 0.52 |
| 5 | 8 | 3.51 | 1.07 |
| 6 | 39 | 6.2 | 12.1 |
| 7 | 56 | 6.55 | 5.82 |
| 8 | 70 | 9.09 | 0.84 |

Although this invention has been described in considerable detail through the preceding examples, such detail is for the purpose of illustration only and is not to be construed as a limitation upon the invention. Many variations can be made upon the preceding examples without departing from the spirit and scope of the invention as described in the following claims.

What is claimed is:

1. A substantially linear ethylene polymer grafted with at least about 0.01 wt %, based on the weight of the grafted ethylene polymer, of an unsaturated organic compound containing at least one ethylenic unsaturation and at least one carboxyl group or at least one derivative of the carboxyl group selected from the group consisting of an ester, an anhydride and a salt, the ethylene polymer characterized as having:
   (i) a melt flow ratio, $I_{10}/I_2$, $\geq 5.63$;
   (ii) a molecular weight distribution, $M_w/M_n$, defined by the equation: $M_w/M_n \leq (I_{10}/I_2) - 4.63$;
   (iii) a density greater than about 0,850 g/cm$^3$; and
   (iv) a critical shear rate at onset of surface melt fracture of at least 50 percent greater than the critical shear rate at the onset of surface melt fracture of a linear olefin polymer having about the same $I_2$ and Mw/Mn.

2. The grafted ethylene polymer of claim 1 in which the substantially linear ethylene polymer comprises between about 95 and 50 wt % polymerized ethylene monomer and between about 5 and 50 wt % of at least one polymerized alpha-olefin comonomer of 3 to about 20 carbon atoms.

3. The grafted ethylene polymer of claim 2 in which the substantially linear ethylene polymer has a density between about 0.860 and about 0.935 g/cm$^3$.

4. The grafted ethylene polymer of claim 3 in which the substantially linear ethylene polymer has a melt flow ratio from about 6.5 to 15.

5. The grafted ethylene polymer of claim 4 in which the substantially linear ethylene polymer has a melt index from about 0.5 to 200 g/10 min.

6. The grafted ethylene polymer of claim 5 in which the substantially linear ethylene polymer has a molecular weight distribution measured by gel permeation chromatography of between about 1.5 and 2.5.

7. The grafted ethylene polymer of claim 6 in which the substantially linear ethylene polymer is an interpolymer of ethylene and at least one comonomer selected from the group consisting of propylene, 1-butene, 1-hexene, 4-methyl-1-pentene, and 1-octene.

8. The grafted ethylene polymer of claim 7 in which the substantially linear ethylene polymer is a copolymer of ethylene and 1-butene, 1-hexene, 4-methyl-1-pentene or 1-octene.

9. The grafted ethylene polymer of claim 6 in which the substantially linear ethylene polymer is a copolymer of ethylene and 1-octene.

10. The grafted ethylene polymer of claim 6 in which the unsaturated organic compound is selected from the group consisting of maleic, acrylic, methacrylic, itaconic, crotonic, alpha-methyl crotonic and cinnamic acids, anhydrides, esters and their metal salts and fumaric acid and its ester and its metal salt.

11. The grafted ethylene polymer of claim 7 in which the unsaturated organic compound is maleic anhydride.

12. The grafted ethylene polymer of claim 1 in which the grafted unsaturated organic compound is between about 0.05 and about 10% of the weight of the grafted polymer.

* * * * *